(12) United States Patent
Rozumyanskiy et al.

(10) Patent No.: US 9,251,428 B2
(45) Date of Patent: Feb. 2, 2016

(54) ENTERING INFORMATION THROUGH AN OCR-ENABLED VIEWFINDER

(71) Applicant: ABBYY Software Ltd., Nicosia (CY)

(72) Inventors: Michael Rozumyanskiy, Moscow (RU); Boris Samoylov, Moscow (RU)

(73) Assignee: ABBYY Development LLC (RU)

( * ) Notice: Subject to any disclaimer, the term of this patent is extended or adjusted under 35 U.S.C. 154(b) by 599 days.

(21) Appl. No.: 13/671,021

(22) Filed: Nov. 7, 2012

(65) Prior Publication Data

US 2014/0141836 A1     May 22, 2014

Related U.S. Application Data

(63) Continuation-in-part of application No. 12/835,311, filed on Jul. 13, 2010, now Pat. No. 9,055,161.

(60) Provisional application No. 61/226,701, filed on Jul. 18, 2009.

(51) Int. Cl.
| | |
|---|---|
| H04N 7/18 | (2006.01) |
| G06K 9/22 | (2006.01) |
| H04M 1/725 | (2006.01) |
| G06F 3/0488 | (2013.01) |
| G06F 3/0481 | (2013.01) |
| G06F 17/24 | (2006.01) |
| G06K 9/20 | (2006.01) |

(52) U.S. Cl.
CPC .............. *G06K 9/22* (2013.01); *G06F 3/0481* (2013.01); *G06F 3/0488* (2013.01); *G06F 17/243* (2013.01); *G06K 9/2081* (2013.01); *G06K 9/228* (2013.01); *H04M 1/72522* (2013.01); *G06K 2209/01* (2013.01); *H04M 2250/52* (2013.01); *H04M 2250/70* (2013.01)

(58) Field of Classification Search
CPC ............ G06F 17/30247; G06F 3/0481; G06F 3/04883; G06F 17/30253; G06F 3/005; G06K 9/228; G06K 9/3241; G06K 9/325; G06K 9/3258; G06K 2209/01; G06K 9/00; G06K 9/00442; G06K 9/3244; G06T 2207/20104
USPC ................... 382/181, 182, 189, 321; 348/161
See application file for complete search history.

(56) References Cited

U.S. PATENT DOCUMENTS

| | | |
|---|---|---|
| 5,963,893 A | 10/1999 | Halstead et al. |
| 6,072,907 A | 6/2000 | Taylor et al. |
| 6,411,932 B1 | 6/2002 | Molnar et al. |
| 2001/0032070 A1 | 10/2001 | Teicher |
| 2002/0152246 A1 | 10/2002 | Critchlow |

(Continued)

*Primary Examiner* — Andy Rao
*Assistant Examiner* — Jared Walker
(74) *Attorney, Agent, or Firm* — LeighAnn Weiland; Veronica Weinstein (57) ABSTRACT

An improved method for entering text or objects into fields is provided. Instead of a keyboard, a viewfinder provides text segmenting, text selecting and text recognizing (optical character recognition—OCR) functionalities. Text at a marker (e.g., a cursor or crosshairs) associated with the viewfinder is recognized and insertion of the recognized text is performed. The current frame is generally not captured by a user. As the user moves the camera to position a new word at the marker, the view finder is updated to provide results of recognition associated with the new word. A user is able to identify an area of interest, select text or other object of interest, and insert the same into one or more fields. The viewfinder may operate in conjunction with a camera of the electronic device on which the viewfinder is operating. Other mechanisms and variations are described.

25 Claims, 5 Drawing Sheets

(56) References Cited

U.S. PATENT DOCUMENTS

| | | |
|---|---|---|
| 2002/0191847 A1 | 12/2002 | Newman et al. |
| 2004/0037470 A1 | 2/2004 | Simske |
| 2005/0116945 A1* | 6/2005 | Mochizuki et al. ........... 345/418 |
| 2008/0118162 A1* | 5/2008 | Siegemund ................... 382/229 |
| 2009/0048820 A1 | 2/2009 | Buccella |
| 2009/0112572 A1* | 4/2009 | Thorn ............................... 704/3 |
| 2010/0278453 A1* | 11/2010 | King ............................. 382/321 |
| 2011/0014944 A1 | 1/2011 | Samoylov |
| 2011/0175815 A1* | 7/2011 | Zhu ............................... 345/168 |
| 2011/0261213 A1* | 10/2011 | Rottler et al. ............. 348/211.6 |
| 2012/0163664 A1 | 6/2012 | Zhu |

\* cited by examiner

ENTERING INFORMATION THROUGH AN OCR-ENABLED VIEWFINDER

CROSS-REFERENCE TO RELATED APPLICATIONS

For purposes of the USPTO extra-statutory requirements, the present application constitutes a continuation-in-part of U.S. patent application Ser. No. 12/835,311 that was filed on 13 Jul. 2010 and initially titled Video Translate, which is currently co-pending, or is an application of which a currently co-pending application is entitled to the benefit of the filing date. Such application or applications are Related Applications. All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

Embodiments of the present invention generally relate to a method and system for improving and extending available means for entering information into electronic devices in place of actual or virtual keyboards using a digital a camera. The present invention also related to processing text associated with optical character recognition (OCR) and related functions.

2. Related Art

Nowadays there are millions of electronic devices with display screens and applications capable of displaying text, and allowing one to input text through an actual or virtual keyboard. These devices typically have a touch screen, as for example many mobile devices: smartphones, mobile phones, laptops, tablet computers, netbooks, personal digital assistants (PDAs), e-book readers and so on.

Many of the aforesaid devices include advanced displays and associated logic capable of supporting non-keyboard type input methods. For example the devices may support pen-based input and handwriting recognition in addition to touch-based input including use of actual and virtual keyboards and keypads. Many of these electronic devices include a camera component which can be used for optical recognition and insertion of texts captured by the camera.

The aforementioned mobile devices may also include optical character recognition (OCR) software stored in memory.

However, among the significant drawbacks of these devices are their low Optical Character Recognition (OCR) quality due to image blur caused by the movement of the camera and their very slow operation speeds when moving along the text, as they are capable of recognizing only photographed text.

Often, input of information through an actual or virtual keyboard is problematic due to the limit of the size of the characters or keys of the keyboard, limited room on the display for a proper keyboard layout, the limit of time to enter a suitable amount of text and so on. If a user of an electronic device wishes to input any lengthy or substantial sequence of characters, letters, figures, etc., (e.g., a phone number, address of a business for a map application, an SMS text message) a user usually must have access to the traditional virtual or actual keyboard to enter such information. Further, in order to verify correct entry of the information, a user typically must look back and forth between the source of information (e.g., page of a book, lengthy phone number, Web address) or remember the information in strict succession (e.g., phone number, street address). However, in some cases it may be impossible due to environmental conditions, human factors or other unpredictable limitations including those of a software application, a device or an emergent condition or situation of the user. Thus, there is substantial need for improvement of methods of entering text into devices as described more fully herein.

SUMMARY

Embodiments of the present invention disclose techniques to recognize text in a current frame of an image in a view finder of a digital camera. In accordance with one technique, text at a marker (e.g. a cursor or crosshairs) associated with the view finder is recognized and insertion of the recognized text is performed. The current frame is not captured by a user. As the user moves the camera to position a new word at the marker, the view finder is updated to provide results of recognition associated with the new word.

The invention provides a method that includes accessing and displaying an application or field for receiving text-based input, and substituting a displayed virtual keyboard on a screen of a mobile device with a viewfinder and text-selection mechanism. In one implementation, the method includes the use of OCR-related algorithms, segmenting and recognizing of text in a current frame of the view finder and inserting available text in the application or field.

Embodiments of the invention also include the use of digital cameras or mobile devices that implement the aforementioned technique.

For the purposes of finding and recognizing text, an electronic device may include optical character recognition (OCR) and related algorithms or functionality. OCR functionality may be installed locally in the electronic device or may be made available via any technology, protocol, network, etc. in cooperation with any server that operates such functionality.

Generally, optical character recognition (OCR) systems are used to transform current or static representations of paper documents into computer-readable, computer-editable and searchable electronic files. A typical OCR system includes an image-creating device (e.g., scanner, camera) that produces an image of a document and software that processes the images. In the invention, there is no need to create and save the photographed image, OCR is implemented for a current frame interactively. The OCR software can recognize symbols, letters, characters, digits, and other units and save them into a computer-editable format. Text and characters and other information obtained through such OCR functionality may be used as conveniently as entering such information through a traditional actual or virtual keyboard.

BRIEF DESCRIPTION OF THE DRAWINGS

While the claims set forth the enforceable bounds of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

DETAILED DESCRIPTION

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Advantageously, the described invention discloses an electronic device that allows a user to employ OCR algorithms and related functionality in any application of an electronic device such as a mobile device through the use of, for example, a virtual keyboard to launch a new viewfinder tool to enter text into the electronic device. A key of the keyboard may be activated by touching (tapping) the specific button or key, and, displaying text at a marker (e.g. a cursor or crosshairs) associated with the viewfinder on the screen of the electronic device, performing segmentation and recognition of current frame, and inserting recognized characters in the field.

Embodiments of the present invention disclose a method for processing text using a digital camera or digital camera component of a device. The digital camera may be part of a word processing system embodied in a mobile device such as a mobile phone. The word processing system may include the following components:

(1) camera optics including a lens through which an image may be captured or detected;
(2) an image sensor coupled to the camera optics for capturing images;
(3) an image processor for processing images captured by the image sensor; and
(4) a memory for storing image processing software (e.g., OCR software, and captured images).

In one implementation, the word processing or other exemplary system includes other components which have not been mentioned so as not to obscure the present invention, but which components, one skilled in the art would understand to form part of the system.

Figure 3:
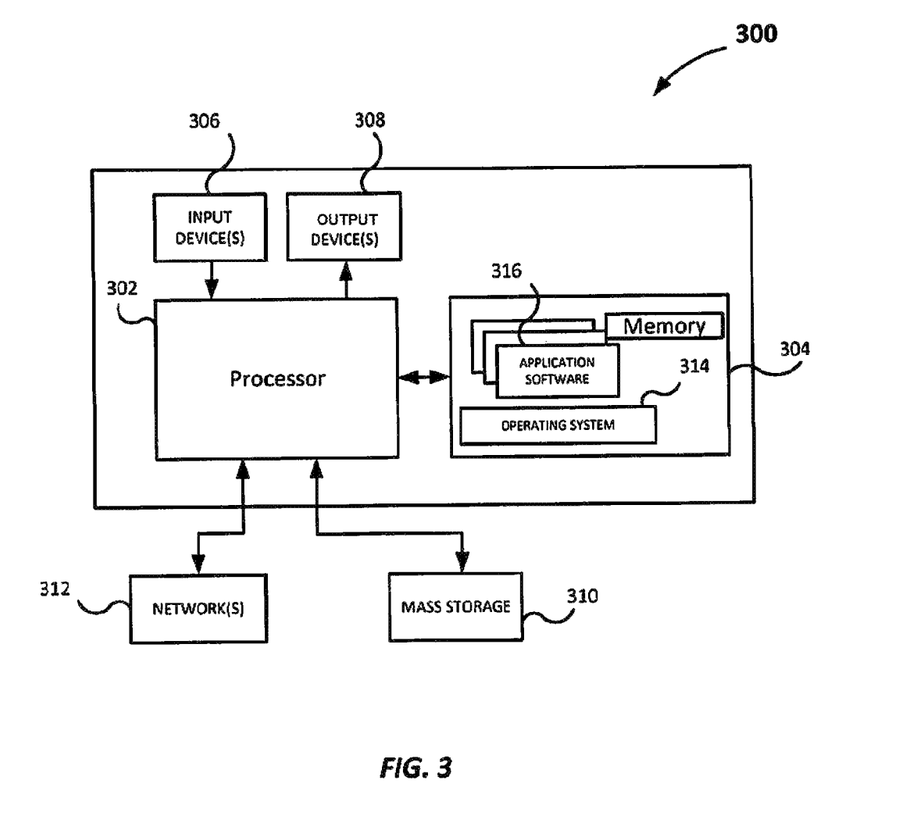
FIG. 3 shows exemplary hardware for implementing the disclosed procedures on an electronic device, in accordance with an embodiment of the present disclosure.

Representative hardware comprising the word processing system, in accordance with one embodiment, is shown in FIG. 3.

In the remainder of this description, a mobile device in the form of a mobile phone is used as a representative example of a word processing system, for exemplary and descriptive purposes.

In accordance with the method for processing text of the present invention, the camera of a mobile device is turned on in a video, photo, or viewfinder mode in order to recognize and insert text. The center or other region of the viewfinder displays a crosshairs or other visual indicator (i.e., indicator of position relative to the subject being imaged). When a user points the crosshairs to a word, segmenting, recognition and insertion are performed. Thus, the user can quickly recognize and insert objects or words by moving the viewfinder crosshairs along the text. It is important to appreciate that no photographs are taken or need be taken, but an image may be persisted, recorded or stored at any stage of the process. Each object or word is added as the crosshairs at, on or near a particular word—when the viewfinder mode is in an insertion sub-mode. A user-specified language may be selected as part of a setup or configuration operation.

Figure 1A:
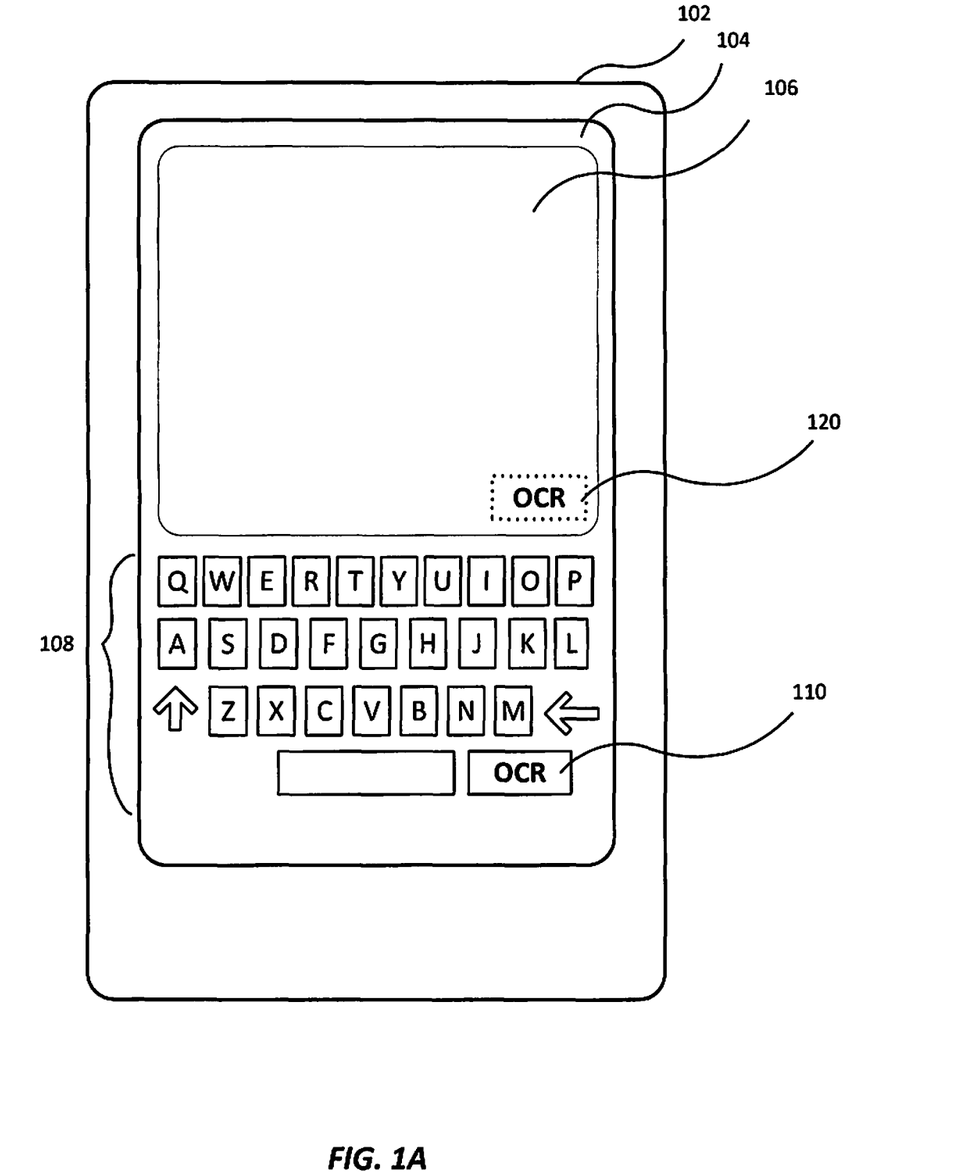
FIG. 1A shows an exemplary screen of an electronic device, in accordance with an embodiment of the present disclosure.
Figure 1B:
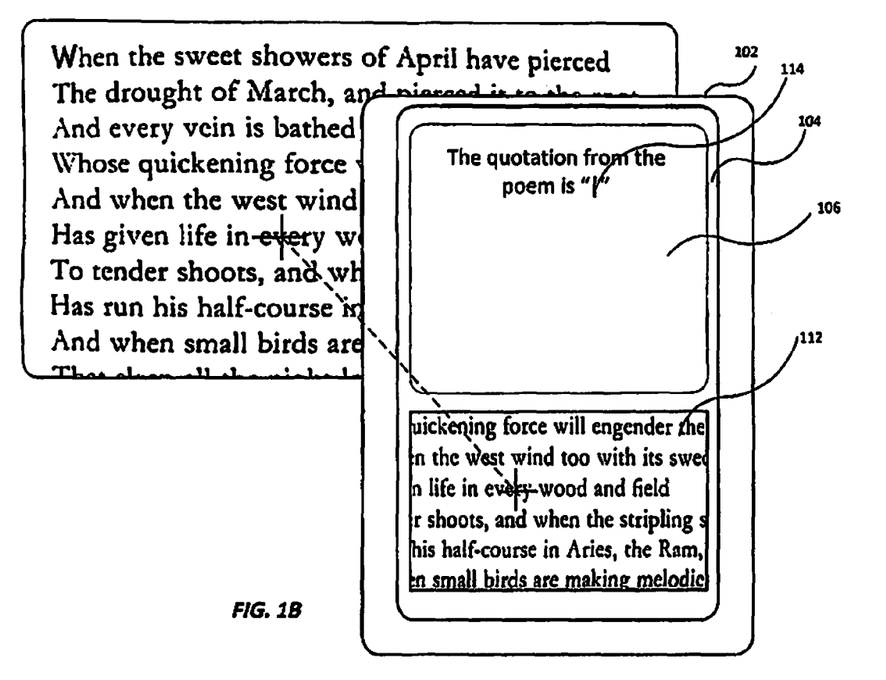
FIG. 1B shows an example of the screen of the electronic device prior to insertion of text at a cursor in a field or application ready to receive text.
Figure 1C:
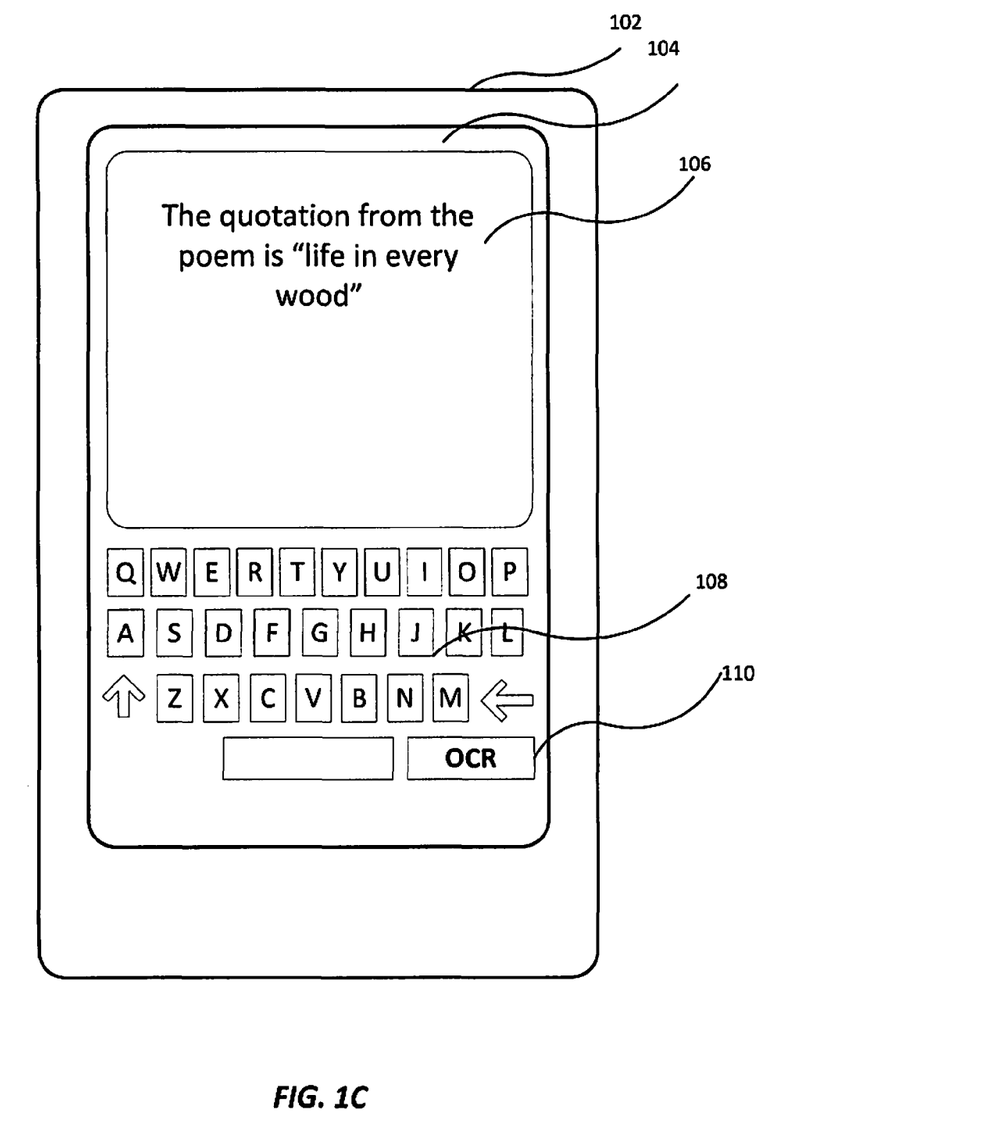
FIG. 1C shows an example of displaying the result of inserting recognized characters in the field prepared to receive text.

Referring now to FIGS. 1A, 1B and 10, these drawings illustrate an example of an electronic device 102 on which to practice the invention, the electronic device 102 comprises a display screen 104, displaying a field 106 for receiving text (no text shown in FIG. 1A), a virtual keyboard 108, with a specific or designated user interface element or button 110 for triggering and running of a viewfinder and OCR functionalities. The button 110 may be a real or virtual button or other user interface element. Further, the trigger or user interface element or control may be a region 120 included with or overlaid on a field. The overlay of the control 120 may be displayed at the time or in response to activating a field 106 for entry of information, or the control 120 may be included with each field 106 at any time a field 106 is displayed on the electronic device 102.

While the electronic device 102 is shown generally as a mobile phone, the electronic device 102 may comprise a general purpose computer embodied in different configurations such as a mobile phone, smartphone, cell phone, laptop computer, tablet computer or any other gadget having a screen and optionally a camera or other image generating component or peripheral. A viewfinder of camera allows displaying information represented on paper on the screen 104 of the electronic device 102. The virtual keyboard 108 is representative of all types of keyboards, both real and virtual, for electronic devices, and the virtual keyboard 108 is representative of any mechanism or user interface element designed for entering text such as through a touch screen.

With reference to FIG. 1B, according to one exemplary implementation, a viewfinder 112 replaces the virtual keyboard 108 at about the time an OCR button 110 is activated (in response to the OCR button 110 being activated). Alternatively, the viewfinder 112 may replace some or all of an activated field 104, or may be placed on a previously unused portion of the display screen. The viewfinder 112 may operate as part of the operating system of the electronic device 102, or may be embedded or associated with any operating program. The viewfinder 112 and accompanying functionality may be installed separately through the operating system of the electronic device 102, or may be compiled and integrated with the runtime application associated with the field 104.

Figure 2:
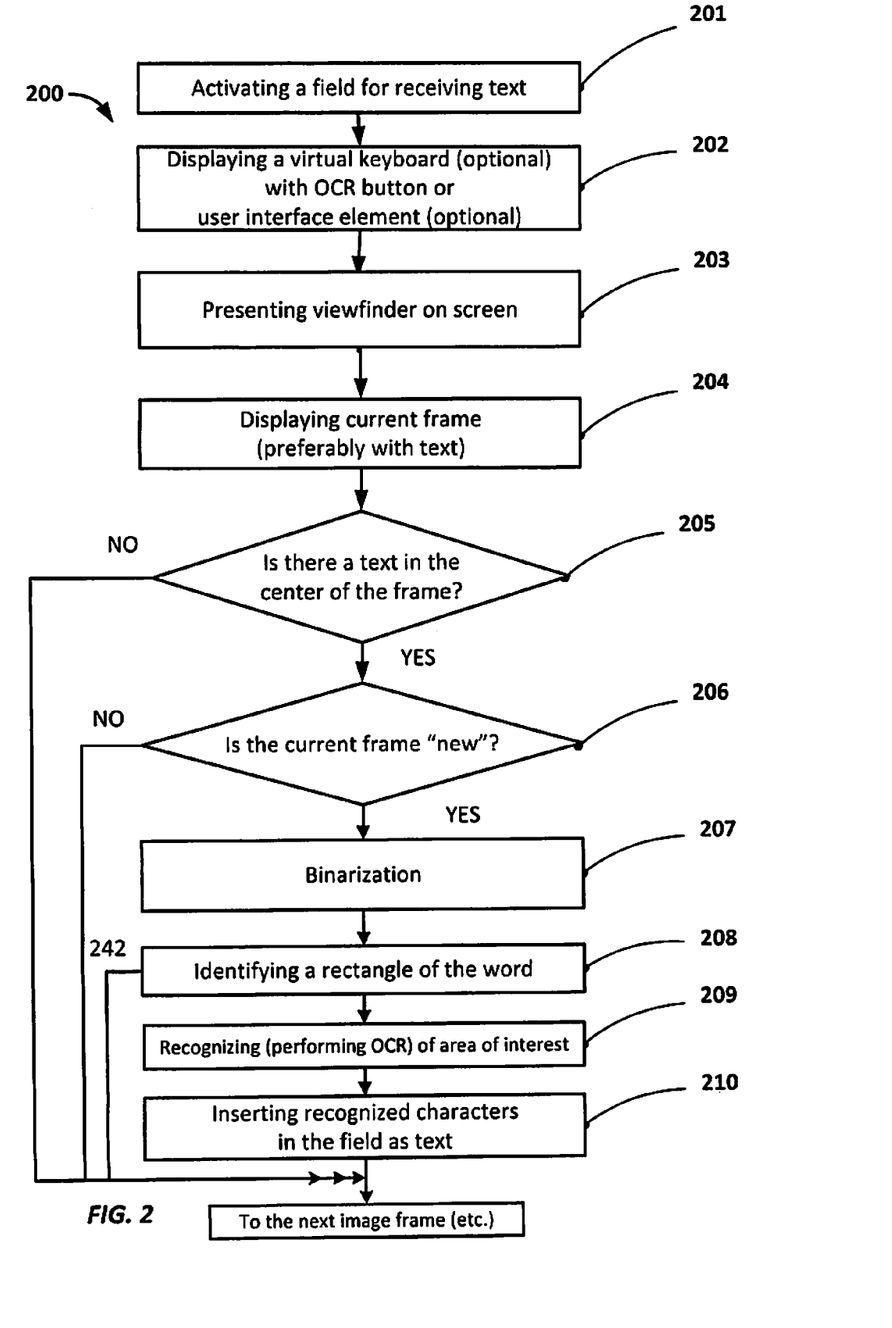
FIG. 2 shows a flowchart of operations performed, for example by software and/or hardware, in accordance with an embodiment of the present disclosure.

Referring now to FIG. 2, a flowchart of operations is shown for performing a method, for example by software, in accordance with an embodiment of the present disclosure. At step

201, a field is activated for receiving text. The field for receiving text may be associated with any application, process or user interface element operating on the electronic device. For example, a field for text entry is activated and displayed on the screen by tapping (or touching) the screen. Examples of fields include those associated with an e-mail application, an SMS text messaging application, fields associated with an Internet browser, and so on.

At the same time as touching (or tapping) or activating the field for text entry, according to one implementation of the invention, a virtual keyboard 108 is activated and displayed on the screen at step 202. At the current time, without the use of the described invention, a virtual keyboard 108 is nearly essential for devices with touch screens for the purpose of entering text or characters into fields of applications. Alternatively, users would be forced to use a handwriting recognition application or function in order to enter text into fields of applications.

Returning to FIG. 2, at step 203, when a user wishes to input or enter information into the electronic device (in the field for text entry), an OCR button or other user interface element, such as an additional button associated with the virtual keyboard 110 is triggered by the user. The button or user interface element may be part of or may be overlaid on the field for receiving text. The term "information" can mean any character or characters, text, figures, images and so one. The term "OCR button" is relative. This specific button of or associated with the keyboard 110 of the electronic device provides the opportunity to activate, start and run a viewfinder for subsequent optical character recognition of the current frame associated with viewfinder. The viewfinder may be associated with, or may also operate, a camera of the electronic device in addition to serving as a mechanism to enter information (e.g., text, objects) into a field. The next step of the flowchart 200 involves presenting and operating the viewfinder on the screen of the electronic device. Operation of the viewfinder may involve operating the camera of the electronic device in association with the viewfinder 112. In one exemplary scenario, when the viewfinder is activated and presented on the screen, a camera functionality is also activated. The camera is then directed toward a subject of interest, for example toward text, and the screen of the electronic device (specifically, the viewfinder) displays a representation of the text at step 204. The viewfinder 112 displays the subject of interest on the screen 104 of the mobile electronic device 102. In a preferred implementation or embodiment, the viewfinder replaces on the screen the virtual keyboard 110; this replacement is shown in FIG. 1B. Consequently, the field for text entry 106 and the viewfinder 112 with the subject of interest are displayed on the screen at substantially the same time or at the same time. Such simultaneous display makes it easier for inputting or entering text from a selected part of the subject or area of interest shown in the viewfinder 112. The place for inserting the selected and recognized area of interest is represented with a cursor "I" (114) in the field for receiving text 106.

In one embodiment, to insert a word that appears at or near the crosshairs of the viewfinder, frames visible in the viewfinder are analyzed for the purpose of detecting text. If text is detected, the OCR software segments, recognizes, or segments and recognizes the word in the center of the viewfinder. The viewfinder mode is not interrupted. At the same time, the frames visible in the viewfinder are analyzed for sharpness in order to adjust the focus, if required.

In one embodiment, a frame may be processed in several stages. With each stage, the complexity of the stage and duration increases. In most cases, the processing ends at the early stages and does not take long.

Returning to FIG. 2, at step 205, the current frame 204 is analyzed to determine if the object in the center region of the frame is text (this takes about 1 millisecond). Various solutions are available for distinguishing between text and non-text areas. The task may be successfully solved by using, for example, OCR software—segmenting routines, etc. Other methods may also be used. It is important that this initial analysis be fast, therefore, methods are used which provide a rough but quick result on low-resolution images. Such analysis is performed for one, some or all frames. Various strategies are possible. For example, a frame may be analyzed if the camera remains "locked" on an object (i.e., a word) for a certain period of time. Or, frames may be analyzed at regular time intervals (e.g., once every 0.02 seconds, once every 0.05 seconds).

At step 206, the camera movement is analyzed. Based on the latest (or complete) analysis of the image and the data about the movement of the camera (as seen or detected in relation to the viewfinder, or detected by gyroscope, accelerometer, et al.), the system decides if the movement is sufficient to treat the current frame as "new" (about 10 milliseconds). The two data arrays stored in RAM are compared taking into account the time between the two frames: the image in the current frame and the image in the previous frame. Even the slightest shift of the camera will result in two non-identical images. The system analyzes the images to assess the camera movement. If the comparison of the two images reveals only a slight shift, e.g., the cursor remains within the bounds of the word being analyzed, the current frame is not treated as "new" and the analysis is terminated. Thus, not every image is treated as a new frame and subject to a full analysis or OCR analysis to determine either a boundary of a word (e.g., character, letter(s), number(s)), or to determine the actual identity of the word (e.g., characters of the word).

Then, at the step 207, the image is (optionally) binarized (i.e., converted to black-and-white) according to one of several binarization schemes, and at the step 208, a document analysis procedure is used to identify the rectangle (or other shape) that encloses the word on the low-resolution image (about 0.3 seconds). In an exemplary implementation, the document analysis includes identifying an "area of interest"—a rectangle or other shape that segments one or more words. If, at this stage, the system has not found any word(s) in the area indicated by the crosshairs, some of the subsequent stages are skipped (242).

At the step 209, OCR is performed for the word in the identified rectangle in the area (area of interest) indicated by the crosshairs (about 0.5 seconds). Any OCR technology may be used to recognize the word. If an OCR or OCR-related functionality is not available locally on the electronic device, some or all of the area of interest may be sent to a server where OCR or OCR-related functionality is installed or available. The result of the OCR or OCR-related functionality is a string of characters (e.g., letters, numbers, special characters, punctuation). At the OCR step (209), morphology dictionaries may be used, as higher OCR accuracy and error correction is achieved by comparing recognition results with similar word forms in one or more of the morphology dictionaries.

Advantageously, in a preferred embodiment, there is no need to snap a shot (i.e., take a picture, capture an image) of the text for subsequent recognition. The area of interest may be selected by the user in an interactive regime by performing a swiping or touching gesture on the displayed image in the viewfinder 112, such as over one or more words, or over one or more lines of text, or over swiping over (from corner to opposite corner) a rectangular (or another shape) region in the viewfinder. Also the textual blocks presented on the screen of the viewfinder may be preliminarily identified or segmented by the system by processing or identifying some character blocks before manual selection of blocks by a user. So, the system proposes possible variants of blocks in the current frame associated with viewfinder for subsequent recognition. Tapping on the proposed blocks initiates the process of recognition (OCR). Selected characters on the screen (text, figures, etc) are highlighted, or made available for other purposes (e.g., entering text into the field 106), or may be highlighted and made available for other purposes. In an alternative implementation, the act of tapping or selecting one or more blocks that include an individual word triggers freezing of the frame that includes the text.

In alternative embodiment, a shot of the subject of interest from the camera is taken and persisted (e.g., stored) by the camera, camera application, or combination of applications, operating system functionality, and the like. The capturing may be to a dedicated location for archiving (e.g., documents folder), or the capturing may be to a temporary cache that is flushed out or cleaned—such as at the time of closing of the viewfinder functionality or at a time of closing the application that includes the field or region that receives captured text. An image may be captured by the camera in response to pressing or activating a real or virtual shot button of the camera or application that controls the camera. After that, whether an image is persisted or not, a selection of an area of interest may be made on the image displayed in the viewfinder 112. The area of interest ideally may contain any type of character: letters, figures, numbers, etc.

In another alternative embodiment, a photographed image from a memory storage of a device, instead of displayed by the viewfinder, may be displayed simultaneously with displaying the field for entry of the text. It is useful in the case when the photograph of the text was made before the process of (interactive) writing or text entry in the field. For example, the object of interest may not always be available, so it cannot be captured by the viewfinder at a certain moment. For example, if a text from any billboard or advertisement was captured from the window of a moving car it may not be available one more time—at the time a user desires to enter text into a field. This is one reason that the described alternative function is available.

Selection of an area of interest may be performed by selecting a portion of text to be inserted by using—for example—a gesture to point at an area of the display or a motion of a figure on the screen. By sensing a gesture, the electronic device establishes coordinates of the selected location. The electronic device can then use these coordinates to identify or predict the characters or subject for selection in the viewfinder 112.

The recognized object or string of characters received from the previous step (209) is inserted in the field for inputting the text at the next step 210. FIG. 1C shows the result of inserting segmented and recognized text from the area of interest in the field that was primed for receiving text. In one implementation, the field remains activated (the cursor 114 remains active in the field), and any mistakes in recognition of the text as taken from the viewfinder may be corrected. Insertion may include insertion of a segmented object (and recognition occurs after insertion of the segmented area or "object"). Alternatively, segmenting and recognition occur prior to insertion of encoded (e.g., ASCII-encoded) text or characters are inserted in the field.

In an exemplary scenario, recognition of the text in a current frame in association with a camera component may be used for simplifying a process of making phone calls and sending email messages by mobile electronic devices. That means recognition using the techniques described herein avoids manual input of a phone number or email address by directing recognition of text through a viewfinder on a phone number or email address. For example, a user accepts a business card at a trade show. The user wishes to send an email message to the person associated with or referenced on the business card. The user pulls out an electronic device, for example, her mobile phone or smart phone.

In one embodiment of the above-described scenario, the user opens an application associated with email (e.g., an email client), activates the "to" field, and the viewfinder is launched as described herein. The user then points the camera of the smart phone at the business card and places the indicator (e.g., crosshairs) at, near or underneath the email address that is on the business card. The appropriate processing is engaged. The email address is found, the viewfinder disappears, and control passes back to the application. The email address on the business card is placed into the "to" field associated with the email client. With just one or two touches or inputs to the electronic device, the user has been able to quickly capture and use information from a printed source without having to re-enter the information and without being required to capture and retain an image.

In another embodiment of described above scenario, user directs a viewfinder on the phone number (or email address) before opening an appropriate application (e.g., an email client) or before calling. The current frame associated with viewfinder is recognized and possible sequences of characters (e.g., phone number, email address) are highlighted on the display (viewfinder). The user selects the appropriate one (sequence of characters or designated activity), by touching on it. When the email address or phone number is selected, the viewfinder disappears, and control passes to the application. Or, in other alternative embodiments, calling or launching an email client is performed automatically by detecting the email address or phone number in the current frame of viewfinder. Also, one option includes capturing an image with the viewfinder.

In an alternative embodiment, the entire photographed image (or the cropped or selected part of it) may be inserted in the field for text entry as a picture. In this case, a photographed image may not contain a set of characters for subsequent recognition. It may be just a photo of some object, for example a car, a tree, a child and so on. Consequently the next step (OCR) 207 may be omitted and step 208 is performed after performing step 206.

FIG. 3 shows an exemplary hardware 300 that may be used to implement the electronic device 102 in accordance with one embodiment of the invention. Referring to FIG. 3, the hardware 300 includes at least one processor 302 coupled to a memory 304 and having a touch screen among output devices 308 which in this case is serves also as an input device 306. The processor 302 may be any commercially available CPU. The processor 302 may represent one or more processors (e.g. microprocessors), and the memory 304 may represent random access memory (RAM) devices comprising a main storage of the hardware 300, as well as any supplemental levels of memory, e.g., cache memories, non-volatile or back-up memories (e.g. programmable or flash memories), read-only memories, etc. In addition, the memory 304 may be considered to include memory storage physically located elsewhere in the hardware 300, e.g. any cache memory in the processor 302 as well as any storage capacity used as a virtual memory, e.g., as stored on a mass storage device 310.

The hardware 300 also typically receives a number of inputs and outputs for communicating information externally. For interface with a user or operator, the hardware 300 usually includes one or more user input devices 306 (e.g., a keyboard, a mouse, imaging device, scanner, etc.) and a one or more output devices 308 (e.g., a Liquid Crystal Display (LCD) panel, a sound playback device (speaker). To embody the present invention, the hardware 300 must include at least one touch screen device (for example, a touch screen), an interactive whiteboard or any other device which allows the user to interact with a computer by touching areas on the screen. The keyboard is not obligatory in case of embodiment of the present invention.

For additional storage, the hardware 300 may also include one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 300 may include an interface with one or more networks 312 (e.g., a local area network (LAN), a wide area network (WAN), a wireless network, and/or the Internet among others) to permit the communication of information with other computers coupled to the networks. It should be appreciated that the hardware 300 typically includes suitable analog and/or digital interfaces between the processor 302 and each of the components 304, 306, 308, and 312 as is well known in the art.

The hardware 300 operates under the control of an operating system 314, and executes various computer software applications 316, components, programs, objects, modules, etc. to implement the techniques described above. In particular, the computer software applications will include the client dictionary application and also other installed applications for displaying text and/or text image content such a word processor, dedicated e-book reader etc. in the case of the client user device 102. Moreover, various applications, components, programs, objects, etc., collectively indicated by reference 316 in FIG. 3, may also execute on one or more processors in another computer coupled to the hardware 300 via a network 312, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for facilitating text entry for an electronic device, the method comprising:
    activating a field for text entry on a display of the electronic device;
    displaying a current frame on the display associated with a viewfinder of the electronic device concurrently while also displaying the activated field for text entry;
    determining an area of interest in the current frame;
    recognizing text in the area of interest associated with the current frame, wherein recognizing text in the area of interest is performed without capturing the current frame in the viewfinder and without persisting in storage the current frame; and
    displaying text corresponding to the recognized text in the activated field.

2. The method of claim 1, wherein determining the area of interest comprises recognizing an object in the area of interest without interrupting displaying of the current frame in the viewfinder.

3. The method of claim 1, wherein determining the area of interest is based on a selection associated with the area of interest in the current frame in association with the viewfinder.

4. The method of claim 3, wherein the display of the electronic device is touch-sensitive, and wherein the selection associated with the area of interest includes an indication of a gesture detected along the touch-sensitive display.

5. The method of claim 1, wherein determining the area of interest is based on an analysis of an area of the current frame centered on a marker associated with the viewfinder detecting an area on a marker.

6. The method of claim 1, wherein the method further comprises:
    displaying a new current frame based on a detected movement of the electronic device or a detected change of the new frame relative to the current frame.

7. The method of claim 6, wherein displaying the new current frame based on the detected change of the new frame relative to the current frame includes displaying the new frame when a marker is outside an area defined relative to the current frame.

8. The method of claim 1, further comprising inserting a copy of the text in the display field, wherein inserting a copy of the text in the displayed field is performed with respect to the viewfinder in proximity to the detected area of interest.

9. The method of claim 8, wherein the text in the area of interest has one or more characters, wherein said recognizing the text is recognizing one or more characters, and wherein inserting the copy of the text is inserting the one or more characters in the displayed field.

10. The method of claim 1, wherein displaying the current frame in the viewfinder includes displaying a representation of at least a portion of the current frame in the viewfinder of the electronic device.

11. The method of claim 1, wherein displaying the current frame in the viewfinder is facilitated by a camera that is part of the electronic device.

12. The method of claim 11, wherein said displaying the viewfinder on the display of the electronic device includes providing a control for the camera.

13. The method of claim 1, wherein a virtual keyboard is activated and displayed in response to activating the field for text entry, and wherein the viewfinder is displayed in response to detecting a selection to display the viewfinder.

14. The method of claim 13, wherein the viewfinder substantially replaces the virtual keyboard on the display of the electronic device.

15. The method of claim 13, wherein the viewfinder is displayed simultaneously with at least a portion of the virtual keyboard on the display of the electronic device.

16. The method of claim 1, wherein detecting a selection associated with an area of interest in the current frame in association with the viewfinder is made in an interactive regime of the viewfinder of a camera application.

17. The method of claim 1, wherein displaying the current frame includes accessing an image from a memory storage of the electronic device.

18. The method of claim 1, wherein recognizing the text in the area of interest associated with the current frame further comprises:
analyzing the recognized text in the area of interest;
initiating a call if the recognized text in the area of interest is a telephone number; and
opening an email client if the recognized text in the area of interest is an email address.

19. An electronic device for entering text into a text field, the electronic device comprising:
a processor;
a display in electronic communication with the processor;
a memory in electronic communication with the display and the processor, the memory configured with instructions to perform a method, the method including:
activating a field for text entry on the display of the electronic device;
displaying a current frame on the display concurrently while also displaying the activated field for text entry, wherein the current frame is associated with a viewfinder;
determining an area of interest associated with the viewfinder;
recognizing text in the determined area of interest associated with the current frame, wherein recognizing text in the determined area of interest is performed without capturing the current frame in the viewfinder and without persisting in storage the current frame; and
displaying text corresponding to the recognized text in the activated field.

20. The electronic device of claim 19, wherein said determining the area of interest includes segmenting characters associated with said area of interest, and wherein said displaying text includes recognizing characters and inserting said recognized characters in the activated field.

21. The electronic device of claim 19, wherein said determining the area of interest includes performing recognition of characters associated with said area of interest, and wherein said displaying text includes inserting characters in the activated field.

22. The electronic device of claim 19, wherein the electronic device further comprises a camera, and wherein displaying the current frame in the viewfinder includes displaying a representation of at least a portion of a frame of video dynamically captured by a camera application associated with the electronic device.

23. The electronic device of claim 22, wherein said displaying the viewfinder on the display of the electronic device includes providing a control for the camera.

24. The electronic device of claim 22, wherein the method further comprises capturing with the camera and storing the frame in a storage of the electronic device in addition to displaying the portion of the frame in the viewfinder.

25. The electronic device of claim 19, wherein a virtual keyboard is activated and displayed in response to activating the field for text entry, and wherein the viewfinder is displayed in response to detecting a selection to display the viewfinder.

* * * * *